United States Patent
Rinscheid

(10) Patent No.: US 7,460,995 B2
(45) Date of Patent: Dec. 2, 2008

(54) SYSTEM FOR SPEECH RECOGNITION

(75) Inventor: Ansgar Rinscheid, Gilde (DE)

(73) Assignee: Harman Becker Automotive Systems GmbH (DE)

( * ) Notice: Subject to any disclaimer, the term of this patent is extended or adjusted under 35 U.S.C. 154(b) by 915 days.

(21) Appl. No.: 10/769,028

(22) Filed: Jan. 29, 2004

(65) Prior Publication Data
US 2004/0243406 A1 Dec. 2, 2004

(30) Foreign Application Priority Data
Jan. 29, 2003 (EP) .................... 03002067

(51) Int. Cl.
G10L 15/06 (2006.01)
(52) U.S. Cl. .................. 704/243; 704/246; 704/231; 704/251; 704/256
(58) Field of Classification Search .............. 704/201, 704/231, 251, 256, 270, 243, 246, 260; 715/532, 715/533
See application file for complete search history.

(56) References Cited
U.S. PATENT DOCUMENTS

| | | | | |
|---|---|---|---|---|
| 4,164,025 A | * | 8/1979 | Dubnowski et al. | 715/533 |
| 4,355,302 A | * | 10/1982 | Aldefeld et al. | 704/243 |
| 5,204,905 A | * | 4/1993 | Mitome | 704/260 |
| 5,778,405 A | * | 7/1998 | Ogawa | 715/532 |
| 6,065,003 A | | 5/2000 | Sedluk | |
| 6,122,612 A | * | 9/2000 | Goldberg | 704/231 |
| 6,205,428 B1 | * | 3/2001 | Brown et al. | 704/270 |
| 6,208,965 B1 | * | 3/2001 | Brown et al. | 704/246 |

OTHER PUBLICATIONS

European Search Report for an EP Application No. EP 03002067.1, dated Jun. 13, 2003, 2 pages.
Bahl, Lalit R. et al., "A Fast Approximate Acoustic Match for Large Vocabulary Speech Recognition," *IEEE Transactions on Speech and Audio Processing*, No. 1, Jan. 1993, pp. 59-67.
Owolabi, O. et al., "Fast Approximate String Matching," *Software—Practice and Experience*, vol. 18, No. 4, Apr. 1988, pp. 387-393.

* cited by examiner

*Primary Examiner*—Vijay B Chawan
(74) *Attorney, Agent, or Firm*—Brinks Hofer Gilson & Lione

(57) ABSTRACT

This invention provides a system for speech recognition comparing speech against stored character strings in memory. Speech is transformed into spoken character strings. To accelerate the identification, a small group of characters from the stored character strings and the spoken character string are compared and the probabilities for identification may be calculated from those results. Those stored patterns, where the probability for identifying the speech exceeds a predetermined value, may be selected for further processing. The selected strings may have the remaining characters added to the group of characters for the next comparison. Alternatively, the number of characters for comparison may be incremented by a predetermined number in a step-by-step fashion, reducing the number of comparisons in subsequent steps as the probabilities for identification rise. The character string in memory with the highest probability for the identification match may be recognized as the character string identifying the speech.

19 Claims, 4 Drawing Sheets

FIG. 4

|   | A | B | C | X | O | P | Q | R | S | T | X |
|---|---|---|---|---|---|---|---|---|---|---|---|
|   | 1 | 2 | 3 | 4 | 5 | 6 | 7 | 8 | 9 | 10 | 11 |
| 1 | A | B | C | D | E | F | G | H | I | J | K |
| 2 | E | F | G | H | L | L | X | Z | A | D | J |
| 3 | I | J | K | L | D | R | J | U | M | T | V |
| 4 | M | N | O | P | J | M | L | O | X | A | F |
| 5 | Q | R | S | T | F | Q | B | I | S | S | J |
| 6 | U | V | W | X | K | M | U | N | P | Y | Z |
| 7 | Y | Z | A | B | G | L | O | F | D | K | A |
| 8 | C | D | E | F | R | C | T | H | N | V | G |
| 9 | G | H | I | J | T | T | R | O | D | E | I |
| 10 | A | B | C | D | O | P | Q | R | S | T | U |
| 11 | A | B | C | D | M | R | D | O | L | P | T |
| 12 | A | B | C | D | X | A | B | R | U | A | L |
| 13 | M | N | O | P | L | I | F | C | Q | T | Y |
| 14 | Q | R | S | T | F | K | W | B | G | L | U |
| 15 | U | V | W | X | A | X | C | F | M | Q | L |

SYSTEM FOR SPEECH RECOGNITION

PRIORITY CLAIM

This application claims the benefit of European Application No. 03002067.1, filed Jan. 29, 2003.

BACKGROUND OF THE INVENTION

1. Technical Field

This invention relates to a speech recognition system, and more particularly, to a speech recognition system that recognizes speech by comparing speech patterns to reference strings.

2. Related Art

Systems have been developed that recognize limited vocabularies spoken by specific individuals. When a statement is made, these systems compare spoken speech patterns to reference speech patterns. Using a template matching technique, probabilities are assigned to the speech patterns that most closely resemble the spoken patterns. Other speech recognition systems apply complex algorithms to the spoken word. The application of complex algorithms may introduce delays that adversely affect a speech recognition system's performance.

In a template matching speech system, speech recognition can be delayed by the large number of comparisons that occur when identifying a spoken word. The difficulty of the search and the large number of evaluations may result in intolerable delays and complexity. Therefore, a need exists for a speech recognition system that understands the spoken word and minimizes objectionable delays.

SUMMARY

This invention provides a speech recognition system that understands the spoken word for the purpose of receiving commands and data input from a speaker. The system may use a microphone to convert sound waves into electrical signals. The speech recognition system includes a processor or controller that converts the microphone's output into data that represents a character string. A comparator compares the spoken character string to stored character strings. The stored character strings may be resident to a memory within or remote from the processor. The system recognizes the spoken word by first comparing a predetermined number of spoken characters to a predetermined number of characters in the stored character strings. Based on the similarities and/or differences of the first comparison, all of the characters of selected character strings may be compared to all of the corresponding characters in the spoken character string. The selected character string that most closely matches the spoken character string may then be identified.

An alternative speech recognition system compares a predetermined number of spoken characters to a predetermined number of stored characters. Based on the similarities and/or differences, a number of character strings are selected. The number of characters in the selected strings to be compared to the spoken character string is then increased. Based on the similarities and/or differences in a second comparison, a second number of character strings may be selected and the number of characters to be compared to the spoken character string through a third comparison is increased. The process continues until all of the spoken characters are compared to the corresponding stored characters of one or more selected character strings. Alternatively, the process may continue until a likelihood of a match exceeds a predetermined threshold.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 4 is a block diagram of a memory.

DETAILED DESCRIPTION OF THE PREFERRED EMBODIMENTS

The speech recognition system may recognize a spoken word to receive commands and obtain data from a system. The system may be used to transmit, store, manipulate or even create speech. The speech recognition system minimizes delays while maintaining speech recognition quality.

Figure 1:
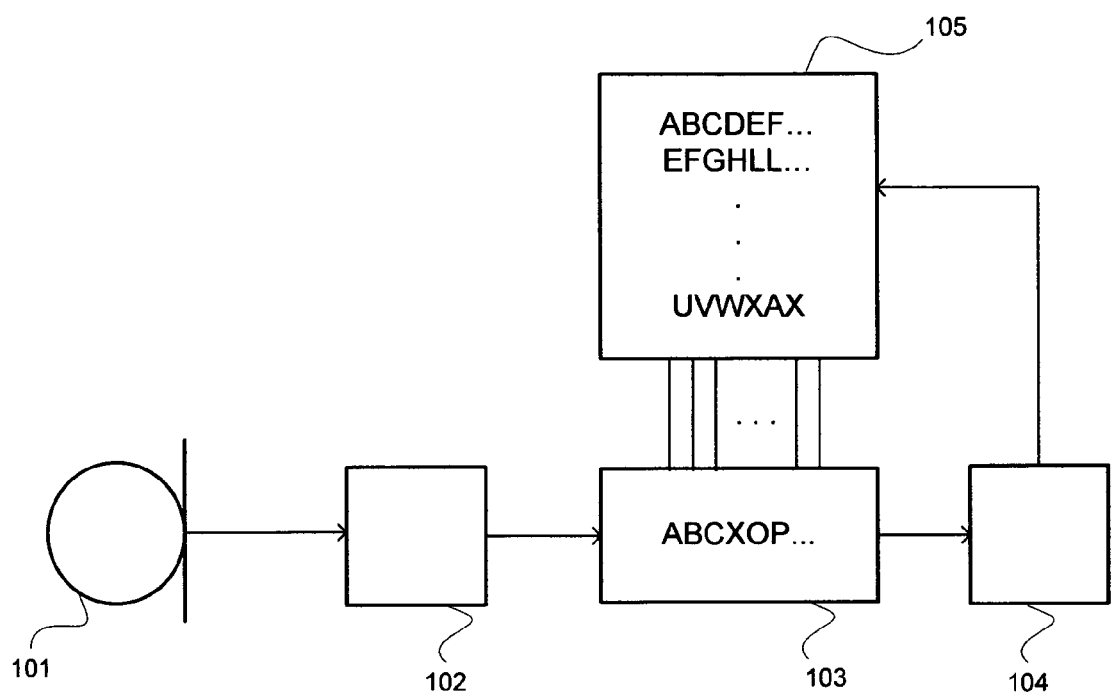
FIG. 1 is a block diagram of a speech recognition system.

FIG. 1 is a block diagram of a speech recognition system. The system may include a microphone 101, a digital signal processor 102, a comparator 103, a control unit 104 and a memory 105. The microphone 101 receives sound and converts sound waves into analog or digital signals which are directed to the processor 102. The processor 102 digitizes the audio signal into spoken character strings that may have variable length. The character strings may contain any sequence of elements from a given character set, such as letters, and are transmitted to the comparator 103 which is in communication with the controller or a computer unit 104 and the memory 105. The comparator 103 compares these character strings to corresponding character strings from memory 105. The control unit 104 takes the result of the comparison and calculates probabilities for a match in an attempt to identify the character string closest to that representing the sound. Ultimately, the character string in memory 105 having the highest probability for a match may be recognized as correlating to the speech signal and that patterned, character string will be processed as the one representing the sound.

Figure 2:
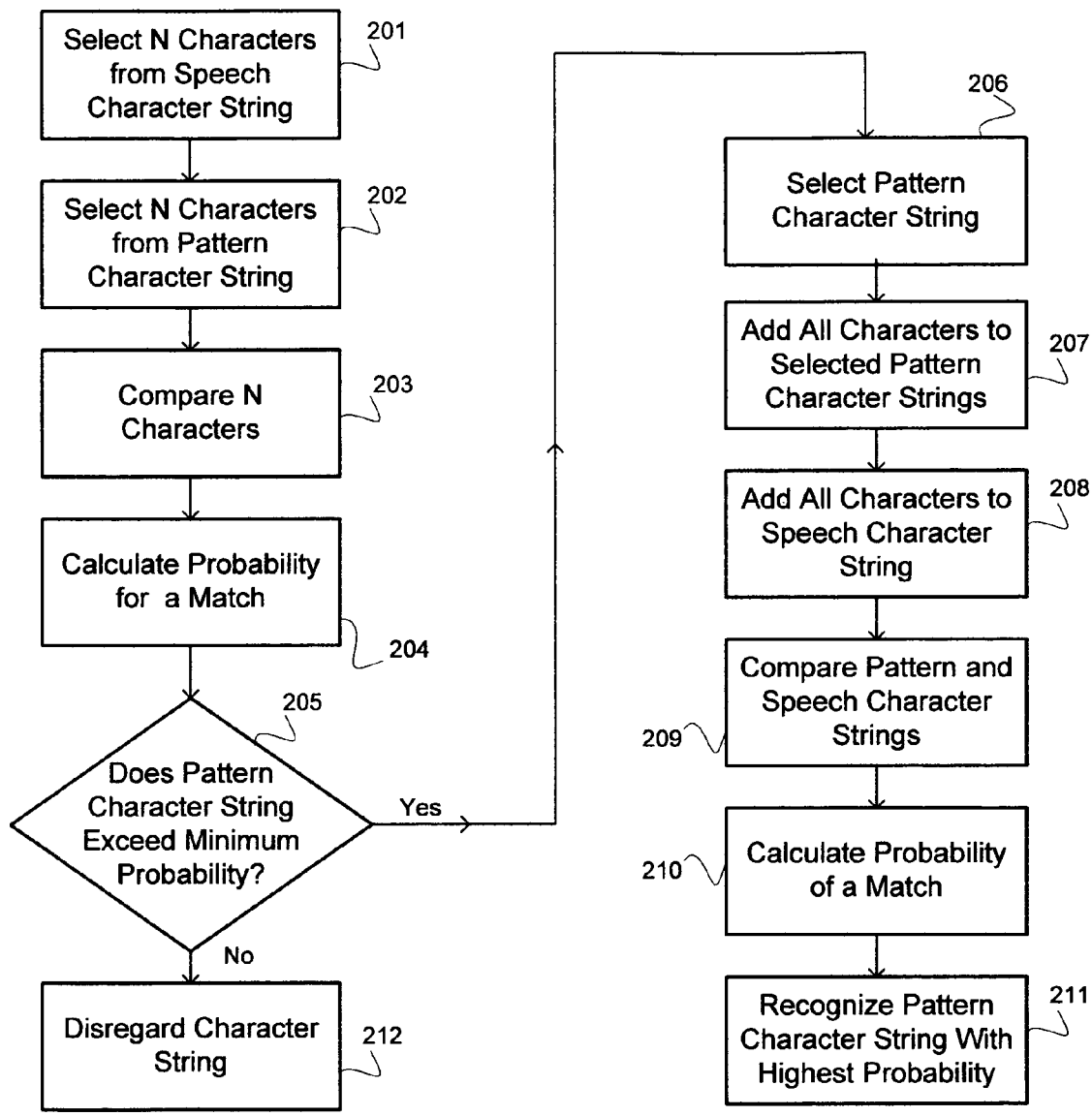
FIG. 2 is a flow diagram of a process of speech recognition.

The character string in memory having the highest probability of matching the speech is determined by the flow diagram in FIG. 2. Once the speech signal has been processed by the digital signal processor 102 and the comparator 103 receives the character string, just a small group of characters, defined by a predetermined number N of characters in the spoken character string 201, will be compared against small groups of characters having the same number N of characters from each set of corresponding character strings 202 in memory 105. As each comparison 203 is made in the comparator 103, the control unit 104 calculates 204 the probability of a match for a possible identification between each of the corresponding character strings in memory 105 and the spoken character string. The control unit 104 has a predetermined minimum value for the probability of a match. For the group of stored character strings that exceed the minimum value 205, those strings will be selected 206 to advance to the next step of the process.

In the next step, the remaining characters from the group of stored character strings will be added 207 to the first N characters used in the first comparison. Also, the remaining characters for the spoken character string will be added 208 to those N characters that were part of the first comparison step 203. At this point, another comparison 209 between all of the characters of the pattern character strings or the selected group of stored characters and all of the characters in the spoken character string may be made in the comparator 103. Using the comparison results, the probabilities for a match are once again calculated 210 by the control unit 104 for each of the selected character strings. The selected character string with the highest probability for a match is determined 211 and that selected character string is the one that is recognized as identifying the sound that was received by the speech recognition system.

Figure 3:
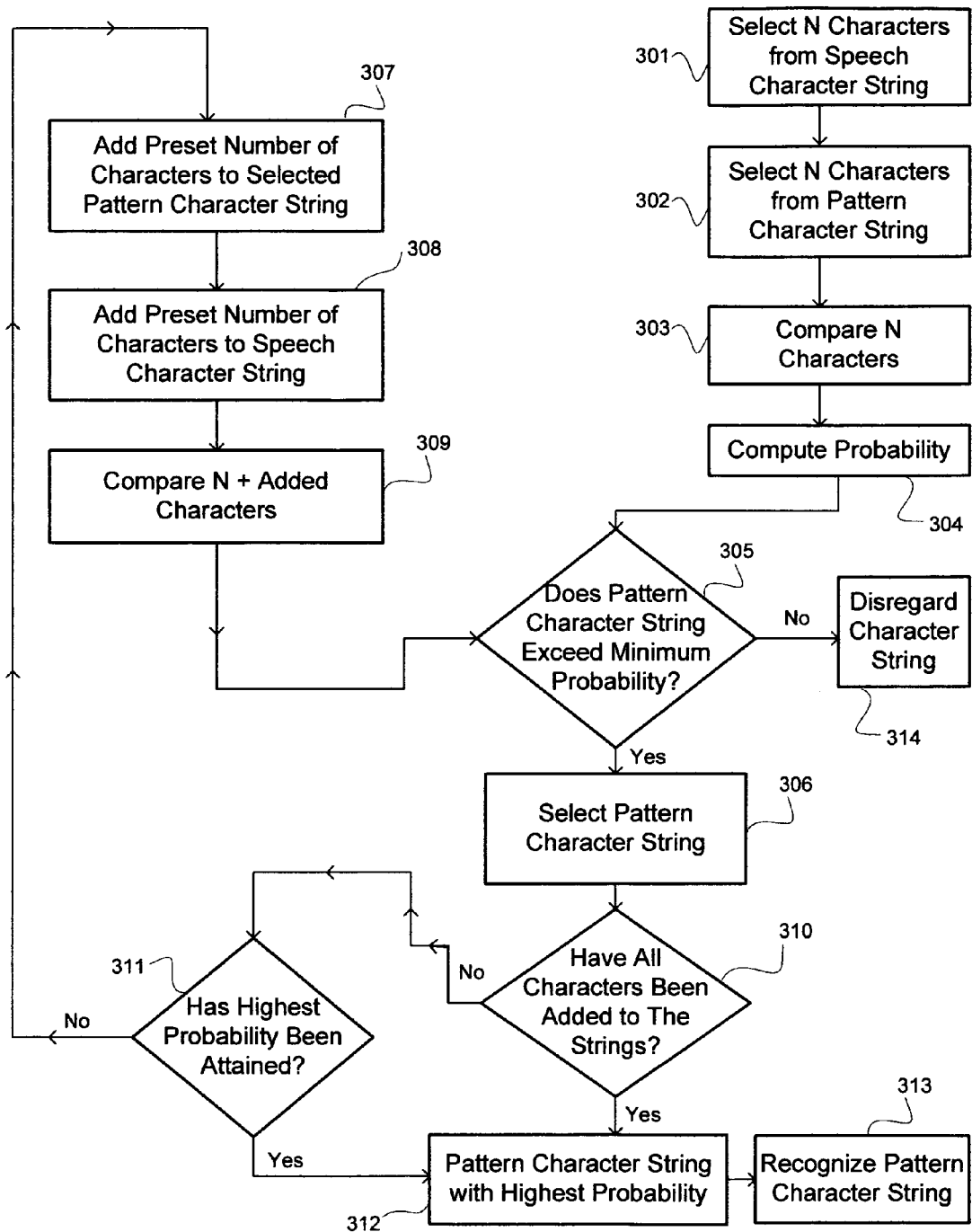
FIG. 3 is a flow diagram of an alternative process of speech recognition.

Alternatively, rather than adding the remaining characters all at once to the first group of characters in the applicable character strings, the remaining characters may be added to the character strings in incremental steps. In this process, as shown in FIG. 3, one character, or a few characters, may be added to the selected character strings and the comparison 309, calculation 304 and selection steps 305 and 306 may be repeated in a step-by-step fashion. Again, one character, or a few characters, may be added to the character strings 307 and 308 in subsequent cycles.

Just as it was performed previously, after each comparison 304, the control unit 104 determines 305 which of the newly selected group of stored character strings have the highest probability for identifying the speech. Those abbreviated, selected character strings, that exceed the predetermined value of probability for that cycle, may be selected 306 once again, and one character, or a few more characters, may be added 307 to these newly selected character strings for further comparison. This process is repeated until all of the characters have been added 310 to the character string or one from the group of stored character strings from memory 105 has been recognized 311 as attaining the highest probability for identifying the sound. Thus, the sound will be recognized 312 and represented in any further processing by that selected character string.

The speech recognition system can best be understood by means of an illustrated example. FIG. 4 shows a layout of the memory 405 with a predetermined reference of M pattern character strings for recognizing speech. The memory 405 is shown as a matrix memory with 15 lines and 11 columns. Each line 1-15 represents a pattern character string. M in this case equals 15.

As an example, the speech or sound is received by the microphone 101 and formed into the character string ABCX-OPQRSTX by the digital signal processor 102. This character string represents the speech or sound that needs to be identified. In the first step of this method, it is assumed for purposes of illustration, that N will equal 4 so that the first 4 characters of the stored character strings 403 and the first 4 characters of the spoken or sound character string 401 to be identified are taken into consideration. Thus, the first four characters, ABCX, of the spoken or sound character string 401 are compared to the first four characters of the pattern character string 403 in the fifteen lines of memory 205. In the pattern character strings 1, 6, 10, 11 and 12, hits exist. In the pattern character strings 1, 10, 11 and 12, three of four characters correspond to the character string to be identified.

Simplistically, the probabilities are calculated as a quotient from the number of hits in each comparison to the total number of characters in a stored character string that were compared. For this example, the minimum value for a probability of a match, indicating an identification might be made, is assumed to be 75%. In the corresponding string of characters in line 6 and in line 15 only one character corresponds to the speech character string. The probability for a match in these lines is therefore ¼ or 25%. The corresponding strings of characters of lines 1, 6, 10, 11, 12 and 15 had hits, but only the pattern strings of characters of lines 1, 10, 11 and 12 will be selected for the last process step because they meet the minimum probability for a match of 75%. In the remaining character strings, the comparison shows that no characters correspond to the spoken character string. Therefore, these lines would not be selected for further processing.

All of the remaining characters for the selected character strings 1, 10, 11 and 12 are added to the original four characters that were analyzed and are now taken into consideration in the following comparison step. Likewise, the remaining characters are added to the original N (four) characters of the speech character string and it is compared to the pattern character strings 1, 10, 11 and 12. For the character string in line 10, six more hits are obtained, whereas in the character string in line 12 only one more hit occurred. In the selected character strings of lines 1 and 11, further hits did not occur. Referring to the pattern character string of line 10, the probability for a match is 9/11, or 81.81%. The probability for identity is 4/11 or 36.36% for the pattern character string of line 12. Thus, the pattern character string in line 10 is recognized as the character string that identifies the speech.

In the alternative method, not all of characters of the pattern character string and the speech character string are taken into consideration all at once. Rather, the number of characters to be taken into consideration in the follow-on steps is increased step-by-step. For this example, one additional character is added step-by-step. After each comparison, calculation and selection, those pattern character strings that are selected will have one character added to the character string until all of the characters in columns 5 to 11 for the selected character strings are considered. It is clear to see that pattern character string 10 would clearly be the only one remaining after the first step because it is the only one increasing in probability for each of the first six steps.

Although the number of comparison cycles increase, the number of pattern character strings analyzed will be reduced as illustrated in the above example, thus reducing the time for the comparison and calculation steps. In the end, the selected character string having the highest probability is the character string that identifies the speech. In the above examples, the same corresponding character string was recognized using both methods, just as it should have been.

Further, the number of characters added to the character strings could have been more than just one at a time. Two or more characters may have been added to the strings in each step, thus possibly increasing the speed at which the identification would occur.

In the system described above, a few characters in all of the stored character strings may be compared against a few characters in the spoken character string in the initial step. The time for locating and identifying the proper character string may be significantly reduced. In this way, the system may target and focus toward the most probable location for the stored, patterned character string. The time saved, when compared to a complete comparison of all the characters in each pattern character string, may be determined by the selection of that first grouping of characters in the character strings. The smaller the number of characters, the less time it takes to identify the speech.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for generating a character string recognized to represent speech comprising:
    performing a first comparison which compares a spoken character string having an at least N number of characters to a set of pattern character strings stored in a memory and each of the pattern character strings, wherein the first comparison comprises;
        selecting the N number of characters from the spoken character string;
        comparing N times each character of the N number of characters to each pattern character string;
        determining an exact match between one or more characters of the N number of characters and one or more characters of each of the pattern character strings; and
        calculating a first match probability of each of the pattern character strings based on a number of hits that exactly matches one or more of the N number of characters of the spoken character string;
    selecting a group of pattern character strings from the memory based on the first match probability;
    performing a second comparison which compares an M number of characters of the spoken character string to remaining characters in each of the selected group of pattern character strings;
    calculating a second match probability of the each of the selected group of pattern character strings based on a total number of hits that exactly matches the one or more of the N number of characters and one or more of the M number of characters of the spoken character string;
    identifying a resultant pattern character string having a highest second match probability representative of a recognized spoken character string;
    generating the resultant pattern character string and processing the resultant pattern character string as the character string to represent the speech; and
    outputting the resultant pattern character string as the character string representing the speech for subsequent processing using the speech output.

2. The method according to claim 1, where calculating the first match probability comprises calculating the first match probability as a quotient from the number of hits in the first comparison.

3. The method according to claim 1, where calculating the second match probability comprises calculating the second match probability as a quotient from the total number of hits in the second comparison.

4. The method according to claim 1, where the second comparison further comprises comparing all of remaining characters of the spoken character string that are not compared during the first comparison to the remaining characters in the each of the selected group of pattern character strings.

5. The method according to claim 1, where the second comparison compares more characters than the first comparison.

6. The method according to claim 1, where the second comparison compares M characters in incremental steps.

7. The method according to claim 6, where the second match probability is always larger than the first match probability for the resultant pattern character string.

8. A sound recognition system comprising:
    a microphone;
    a processor for digitizing sound signals received from the microphone;
    a memory coupled to the processor for storing pattern character strings;
    a comparator for comparing a sound character string formed from the sound signals to the pattern character strings, during a first comparison, the comparator selecting an N number of characters from the sound character string and comparing the N number of characters to each of the pattern character strings N times, and during a second comparison, the comparator comparing remaining characters of the sound character string to remaining characters of the each pattern character string M times where the remaining characters of both the sound character string and the each pattern character string are not compared during the first comparison; and
    a controller which takes a result of the first and the second comparisons from the comparator and calculates a first match probability based on the first comparison and a second match probability based on the first and the second comparisons, where the controller selects a group of pattern character strings based on the first match probability and identifies a resultant pattern character string that recognizes the sound character string based on the second match probability.

9. A system according to claim 8, where the controller calculates the first match probability and the second match probability based on a number of hits between one or more characters of the sound character string and one or more characters of the each pattern character string.

10. The system according to claim 8, where the second comparison is performed by adding one or more of the remaining characters of the sound character string in incremental steps.

11. The system according to claim 8, where the controller calculates the first match probability as a quotient from a number of hits in the first comparison.

12. The system according to claim 8, where the controller further calculates the second match probability as a quotient from a total number of hits in the second comparison.

13. A method for generating a character string recognized to represent speech, comprising:
    providing an input of a spoken character string;
    performing a first comparison which compares the input of the spoken character string to a set of pattern character strings and reduces the set of pattern character strings to a group of qualifying pattern character strings having a match probability that exceeds a predetermined threshold where the first comparison comprises comparing a portion of the spoken character string with the portion of each of the pattern character strings and determining a number of hits between the spoken character string and the each pattern character string;
    performing a second comparison which identifies a resultant pattern character string representative of a recognition of the spoken character string, where the second comparison comprises comparing a part of, or an entire remaining characters of the spoken character string to each pattern character string of the group of qualifying pattern character strings and determining a total number of hits between the spoken character string and one or more characters of the group of qualifying pattern character strings;
    generating the resultant pattern character string and processing the resultant pattern character string as the character string to represent the speech; and outputting the resultant pattern character string as the character string representing the speech for subsequent processing using the speech output.

14. The method according to claim 13, where the second comparison comprises adding the part of, or the entire remaining characters of the spoken character string all at once.

15. The method according to claim 13, where the second comparison comprises adding the part of, or the entire remaining characters in incremental steps.

16. The method according to claim 15, where the second comparison further comprises repeating the comparison between one or more characters of the spoken character string and the added character or characters.

17. The method according to claim 13, where determining the number of hits comprises determining an exact match between one or more characters of the spoken character string and each of the pattern character strings of the set of pattern character strings.

18. The method according to claim 13, where determining the total number of hits comprises determining an exact match between one or more characters of the spoken character string and one or more characters of each of the pattern character strings of the qualifying pattern character strings.

19. The method according to claim 13, where the match probability of the resultant pattern character string during the second comparison is always larger than the match probability during the first comparison.

* * * * *